United States Patent [19]

Colgate et al.

[11] 4,171,070
[45] Oct. 16, 1979

[54] APPARATUS FOR INSERTING AN ADDITIVE LIQUID INTO A FLOWING FLUID AND DISCHARGING THE RESULTANT MIXTURE

[75] Inventors: Samuel O. Colgate; Robert A. Ramey, both of Gainesville, Fla.

[73] Assignee: Samuel Colgate, Robert Ramey and Associates, Gainesville, Fla.

[21] Appl. No.: 805,302

[22] Filed: Jun. 10, 1977

[51] Int. Cl.² .............................................. B67D 5/56
[52] U.S. Cl. .................................. 222/133; 137/564.5;
215/1 C; 222/144.5; 222/148; 222/386.5;
239/313; 239/323
[58] Field of Search ......... 222/94, 95, 105, 129.2–131,
222/133, 144.5, 148, 386.5–387, 389, 509;
137/564.5; 239/313, 323; 220/404; 215/1 C

[56] References Cited

U.S. PATENT DOCUMENTS

| | | | |
|---|---|---|---|
| 1,250,576 | 12/1917 | Gill | 222/387 |
| 3,083,875 | 4/1963 | Welty et al. | 222/95 |
| 3,391,829 | 7/1968 | Gregory | 239/313 X |
| 3,720,230 | 3/1973 | Stockstill | 137/564.5 |
| 3,780,910 | 12/1973 | Wagner | 239/313 |
| 4,047,541 | 9/1977 | Mercier et al. | 239/313 X |

Primary Examiner—Robert J. Spar
Assistant Examiner—Fred A. Silverberg

Attorney, Agent, or Firm—Haight, Hofeldt, Davis & Jambor

[57] ABSTRACT

A dispensing assembly for discharging a flowing fluid into which a desired amount of an additive liquid has been inserted includes a container for the additive liquid which may be removed from a dispenser body. The container is normally positively biased to a closed condition to prevent escape of the additive liquid. Opening of the container is effected upon establishment of a predetermined minimum pressure by the flowing fluid in the dispenser body. Additive liquid is forced from the container into the flowing fluid by a metered amount of flowing fluid inserted into the container to cause a flexible pressure member to force the additive liquid from the container. Opening of the container is not achieved until after the pressure member is exerting a force on the additive liquid. Resistance to flow of the additive liquid from the container is minimized, so that the amount of additive liquid inserted into the flowing fluid is dependent upon the flow rate of the flowing fluid and is essentially independent of the characteristics of the additive liquid. An alternative rinse path is provided to insure rinsing of the dispenser body before and after opening of the container. An appropriate flow regulating arrangement is utilized to selectively direct the flowing fluid through the alternative rinse path or to a pressure chamber to activate a mechanism for opening of the container.

58 Claims, 9 Drawing Figures

APPARATUS FOR INSERTING AN ADDITIVE LIQUID INTO A FLOWING FLUID AND DISCHARGING THE RESULTANT MIXTURE

BACKGROUND OF THE INVENTION

1. Field of the Invention

The present invention relates generally to an apparatus and method for producing and discharging a mixture of a flowing fluid with a predetermined amount of an additive liquid, and more specifically, the present invention relates to a dispensing assembly and method for spraying water containing a metered amount of an additive liquid.

2. Description of the Prior Art

In many instances, it is desired to insert a metered amount of an additive liquid into a flowing fluid, which may also be a liquid (e.g., inserting an insecticide into water being sprayed on plants). In many such cases, again using the insecticide as an example, the additive liquid may be poisonous or otherwise dangerous or harmful. In such a case, a less concentrated form of the additive liquid may be used to minimize the risks occurring from any leakage or other discharge of the additive liquid without a sufficient amount of flowing water to dilute it at the time of discharge. Such an approach has the obvious disadvantages of increasing the amount of additive liquid that must be utilized for a particular purpose, with the attendant increase in cost and the inconvenience of shipping and storing the diluted additive liquid. The necessity of using large amounts of the additive liquid usually increases the problems of dispensing the resultant mixture.

If concentrated additive liquid is utilized, the dispensing assembly periodically requires recharging or refilling of the additive liquid supply in the dispensing assembly. To achieve the transfer of additive liquid from the storage container to the dispensing assembly requires much care to avoid exposing the user to considerable risk. In addition, the storage of the concentrated additive liquid creates the risk of inadvertent discharge of the liquid, such as by a child, with the resultant possibility of harmful exposure.

In dealing with harmful additive liquids, another potential threat is the possibility that additive liquid will remain in the dispensing assembly after usage, so that upon the next usage this undiluted additive liquid will present the risk of harm to either the user or the objects being sprayed. In devices utilizing the pressure of the flowing liquid to force out the additive liquid, a somewhat related danger is presented by the possibility of air pressure in the line forcing out the additive liquid before the flowing liquid is present to dilute the additive liquid.

Apart from the possible hazards, prior art devices exhibit many other deficiencies in operation. For example, many prior art devices work adequately for a particular additive liquid for which they have been designed, but utilization of an additive liquid having a different viscosity or other different material characteristics can result in the insertion of additive liquid amounts that are smaller or greater than desired. Also, most prior art devices are designed for a constant rate of flow of the flowing liquid. In a water line, the pressure variations will vary the rate of flow and hence the concentration of the mixture being sprayed will vary. Also, when the pressure of the flowing liquid is utilized to force out the additive liquid, it is necessary to prevent the flowing liquid from entering and diluting the additive liquid in the container prior to establishment of the pressure to force the additive liquid out. This can be achieved with appropriate valving, but if the proper steps are not followed, dilution of the additive liquid in the container may still follow. In addition, such valving requires either manual operation or complex automatic controls.

Other problems occur with respect to an indication of when the additive liquid container is empty. Various types of signaling approaches may be utilized, but a preferable approach would be to have the dispensing assembly automatically deactivated when the additive liquid has been completely used.

SUMMARY OF THE INVENTION

The apparatus and method of the present invention obviate the problems of prior art devices and provide many additional advantages and benefits that the prior art cannot provide. The result is a dispensing assembly that permits the utilization of concentrated additive liquids, with the attendant benefits, while vitually eliminating the risks normally associated therewith, as well as greatly facilitating use of the additive liquids. Not only does the present invention permit the use of concentrated additive liquids with safety, but it does so while providing extremely accurate metering that automatically adjusts for variations in the rate of flow of the water or other flowing fluid and is independent of the characteristics of the additive liquid. This is all achieved with a structure that is highly resistant to malfunction and which includes numerous other features.

An important aspect of this invention is the utilization of a container for an additive fluid, usually an additive liquid, that is biased to a closed state. This container may be an integral portion of the dispensing assembly, but preferably it is removably attached to a dispenser body to permit the substitution of a full container for an empty one without having to handle the concentrated additive liquid. Only when the container is attached to the dispenser body may the container be opened by an actuating arrangement responsive to pressure established in the dispenser body for discharge of the additive liquid, at least for all practical purposes. (It is possible that someone utilizing the appropriate tools and knowing how the device worked could open the container, but this is highly unlikely).

The container has an inwardly extending neck portion in which at least one additive liquid exit opening is formed near the top thereof. A closure member is mounted to slidably fit over the inwardly extending neck portion to cover and uncover the additive liquid exit openings. A blocking portion of the closure member extends up into the neck portion. A closure bias spring extending between a head of the blocking portion and an inturned lip at the bottom of the neck portion creates a bias force urging the outer sealing portion of the closure member toward the top of the container to close the additive liquid exit openings.

A metering plate having an orifice in the central portion thereof is located in the neck portion above the blocking portion of the closure member. A conduit for a flowing fluid, such as water or another flowing liquid, is provided by the orifice in the metering plate and appropriate openings in the neck portion below the metering plate and in a base of the closure member. This conduit leads to a portion of the container where the water or other flowing fluid can produce a pressure against a suitable flexible pressure member, while separating the water from the additive liquid. In the preferred embodiment disclosed herein, the flexible pressure member is a flexible bag affixed to the closure member with a fluid-tight seal, so that insertion of the water into the interior of the bag through the conduit will cause the bag to expand and force the additive liquid out the additive liquid exit openings. Suitable provision, such as an extension of the blocking portion beyond the base of the closure member, prevents the bag from expanding to the sides of the container and blocking flow of the additive liquid to the exit openings in those cases where the additive liquid has a greater density than the flowing liquid. A suitable indicator, such as a spherical ball, may be located in the container to reveal a lack of additive liquid when the flexible pressure bag expands to prevent rattling of the ball. When the container is transparent or translucent, the absence of additive liquid, especially if the additive liquid is colored, may be visually noted. Also, in such a case, the pressure bag may be of a contrasting color or have suitable markings to indicate exhaustion of the additive liquid.

A dispenser body is utilized in connection with the container to receive the water or other flowing fluid and discharge, such as by spraying, the resultant mixture of flowing fluid and additive liquid. Preferably, this dispenser body is releasibly attached to the container, such as by threads formed on the internal surface of a depending skirt to engage mating threads on the container.

In order to activate the closure member to open the container, pressure produced by the water or other flowing fluid is sensed at an appropriate location, such as a pressure chamber. A plunger disc is located in the pressure chamber and has an attached plunger stem aligned with the orifice in the metering plate in the container. The plunger stem passes through an extending sleeve which fits within and is spaced from the internal surface of the neck portion of the container. A activating bias spring extends along the plunger stem from the plunger disc to an inturned lip at the bottom of the sleeve to force the plunger disc toward the top of the pressure chamber.

When the water pressure in the pressure chamber exceeds a predetermined minimum value (primarily established by the activating bias spring), the plunger disc is driven down into a larger secondary chamber below the pressure chamber to permit the water to flow around the edges of the plunger disc, through the secondary larger chamber, down through the sleeve and out through appropriate openings formed in the inturned lip of the sleeve. At this point, the plunger stem has been passed through the orifice in the metering plate to bear against the blocking portion of the closure member to force the closure member down to open the additive liquid exit openings. The space between the plunger stem and the surface of the orifice in the metering plate forms a metering port of a predetermined size. A portion of the water that passes through the sleeve is conveyed through this metering port, along the water conduit previously described, to the interior of the flexible pressure bag. The majority of the water passing through the sleeve is conveyed through a passageway formed by the outer surface of the sleeve and the inner surface of the neck portion of the container. As the water in this passageway flows past the additive liquid exit openings, the additive liquid forced out these openings is inserted into this water, and the resultant mixture passes through the dispenser body to an appropriate spray head or nozzle for discharge. As the additive liquid exit openings are made very large in relation to the metering port, the resistance to dispensing of the additive liquid is minimized, so that the characteristics of the additive liquid do not appreciably affect the quantity of additive liquid dispensed. Hence, the metering is dependent only upon the water passed through the metering port and the passageway between the sleeve and the neck portion, which will reflect variations in the water flow through the dispenser body, to always provide an accurate metering of the additive liquid being dispensed into the water. It may be noted that the metering is dependent only upon the geometry of the metering areas, which include the metering port, the passageway between the sleeve and the neck portion, and the distance between the end of the sleeve and the metering plate, so long as the flow remains laminar. Also, it may be noticed that a certain amount of water will get into the flexible pressure bag through the additive liquid exit opening prior to activation of the closure member, so that the additive liquid exit openings are not uncovered until a pressure has been established in the flexible pressure bag, thus preventing any dilution of the additive liquid in the container.

In the case when the flowing fluid is a flowing liquid such as water, it is desirable to form a relief vent in the plunger disc. This relief vent permits the escape of gas from the pressure chamber, without actuating the plunger, while not interfering with the establishment of a water pressure. In this fashion, the possibility of dispensing additive liquid from the container before diluting water is present may be obviated.

It should be noted that when the plunger disc is forced into the supplemental larger chamber that a plurality of extended guides are provided to properly position the plunger disc and provide for its accurate alignment when returning to the pressure chamber.

A suitable flow-regulating device is provided to control the flow of flowing fluid to the pressure chamber. In addition, the flow regulating device may be utilized to direct the flowing fluid through an alternative passageway to rinse the dispenser body. Directing of the flowing fluid to the alternative passageway precludes the establishment of a pressure in the pressure chamber by this flowing fluid. In the preferred embodiment disclosed herein, the flow regulating device automatically directs the flowing fluid through the alternative rinsing passageway before and after directing the flowing fluid to the pressure chamber. In this fashion, any additive liquid remaining in the dispenser body upon closure of the container is rinsed out by the flowing fluid upon closure of the container and preceding opening of the container for the next use.

Other embodiments providing other features may be employed. For example, in some applications it is desired to utilize a very small amount of additive liquid. One such application might be in watering grass. It is known that it is preferable to add fertilizer in small amounts over a period of time, rather than in larger amounts at periodic intervals. Thus, by adding small amounts of additive liquid, which would be a liquid fertilizer, to the water being applied to the grass this desirable result could be achieved. For such very small concentrations (e.g., one part in ten thousand), it would be desirable to utilize only a portion of the entire water flow to meter the fertilizer from the container, as otherwise it would be difficult to obtain accurate metering. Accordingly, a bypass route may be supplied for the major portion of the water flow.

In other situations, such as where a soap or detergent may be the additive liquid and it is desired to provide a clear-water rinse, manual control of the mode of operation is desirable. While the first embodiment described could achieve this by setting the flow-regulating device to either the rinse or the additive mode, it may be desirable to add a selection of different spray modes or patterns. Thus, a manual selecting device could be attached to alternatively direct the water to actuate dispensing of the detergent or to provide a clear-water spray in a variety of different spray patterns.

Another desirable feature would be to render the dispensing assembly inoperative upon exhaustion of the additive liquid in the container. One way of achieving this is to separate the blocking portion of the closure member into a central section, against which the plunger stem bears, and an outer section in which the inner section is located. The extension of the leg of the blocking portion is formed to normally preclude passage of the inner section therethrough, but contains a slit or slot at the end to permit forcible passage of the inner section. Such forcible passage is normally prevented by a cap member which holds the split portions of the extension together. An inelastic flexible lead is connected from the cap to the flexible pressure bag, so that upon complete expansion of the pressure bag the lead pulls the cap from the extension of the blocking portion to permit the plunger stem to force the inner section through the outer section. This results in the plunger disc being forced to the bottom of the secondary larger chamber to prevent passage of the flowing fluid through the sleeve. In the case where a bypass route is employed, it would also shut off the flow of flowing fluid through that route. Thus, the dispensing assembly is automatically rendered inoperative upon exhaustion of the additive liquid.

It should be noted that in order to insure that the plunger disc is forced to the bottom of the secondary larger chamber, an upwardly extending ridge about the outer periphery of the disc guarantees that the flowing fluid will force the disc to the bottom of the supplemental chamber. In the absence of this ridge, there is a possibility that the dynamics of the fluid flow could result in the disc not being completely seated against the bottom of the secondary chamber.

When the container is placed in storage, it is possible that water may remain in the pressure bag. As this water freezes, it could create problems due to its expansion. In order to preclude such a possibility, a special cap for the container may be employed. This cap has a special water receiving cavity formed at the top, with an insulated volume below for receiving the top of the container. Insulation insures that freezing will last occur at the top of the container, so that as ice forms in the pressure bag excess water will be forced out through the top of the container. An appropriate passageway in the cap conveys the water into the water receiving cavity. A vent may be formed in the cap to communicate with the water receiving cavity to prevent the buildup of an undesired air pressure, which could interfere with the introduction of water into the water receiving cavity.

In the event that the container is left attached to the dispenser body in freezing conditions, so that the special cap would not be in use, the problems of freezing could be overcome by use of an elastic bottle. In order to provide the desired strength in normal use, a rigid sleeve that would break only under the pressures generated by freezing could be employed. Also, it would be possible to render the dispensing assembly inoperative under such conditions by modification of the arrangement for rendering the assembly inoperative upon exhaustion of the additive liquid.

From the foregoing description, it is clear that the present invention has overcome many deficiencies of prior art approaches, as well as providing amny additional features not contemplated in the prior art. Accordingly, the preferred embodiments described herein provide for safe, accurate metering of an additive liquid into a flowing fluid in a large variety of situations. Handling of the additive liquid is greatly simplified, and the ease of access of the passageways, many of which are formed by the conjunction of the dispenser body in the container, permits ease of cleaning in the event of undesirable foreign matter. The easily accessible passageways include all of the passageways in which the geometry thereof affects the metering rate, so that non-interference with the metering rate by foreign matter may be guaranteed. Undesirable effects produced by the introduction of air into the water line, as well as automatic adjustment to varying flow rates of the water are provided. Potentially dangerous or messy situations occurring from freezing upon storage of the container are avoided. Other features, such as automatically precluding dilution of the additive liquid by water obtaining access to the container and an automatic termination of dispensing assembly operation upon exhaustion of additive liquid, are provided. As a consequence, a dispensing assembly which is extremely safe and provides a number of very advantageous features has been provided.

These and other objects, advantages and features of this invention will hereinafter appear, and for purposes of illustration, but not of limitation, exemplary embodiments of the subject invention are shown in the appended drawing.

DETAILED DESCRIPTION OF THE PREFERRED EMBODIMENTS

Figures 1, 2, 3:
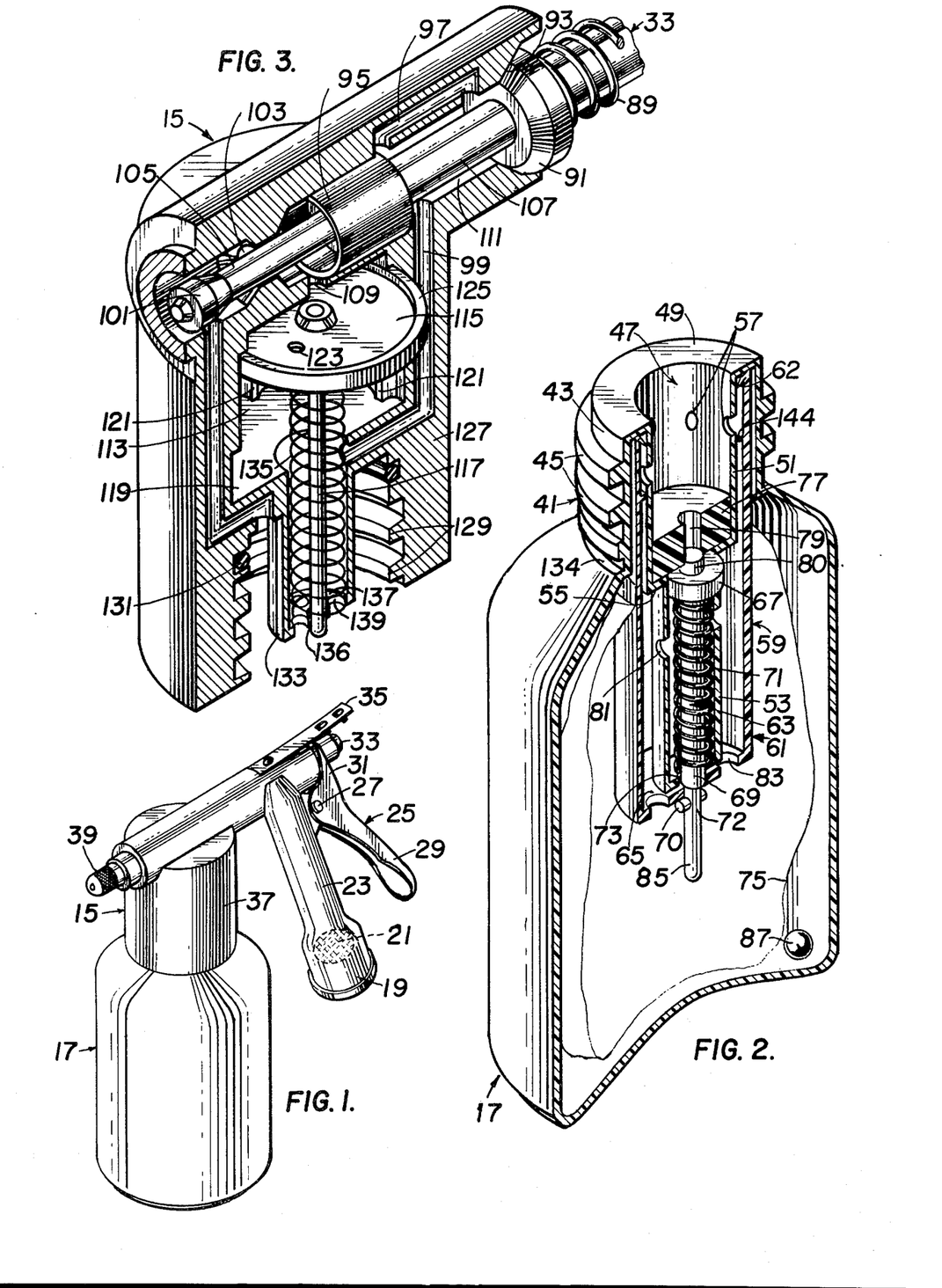
FIG. 1 is a perspective view of a first embodiment of a dispensing assembly constructed in accordance with the present invention.
FIG. 2 is a partially broken away perspective view of the container in the assembly of FIG. 1.
FIG. 3 is a partially broken away perspective view of the dispenser body in the dispensing assembly of FIG. 1.

With reference to FIG. 1, a dispensing assembly constructed in accordance with the present invention as illustrated. The dispensing assembly includes a dispenser body 15 and a container 17.

Dispenser body 15 is adapted to receive a flowing fluid. While any appropriate fluid could be utilized, the description of the preferred embodiments disclosed herein will be in terms of water utilized as the flowing fluid. Thus, a suitable connector 19 is provided for attaching the dispenser body 15 to a suitable source of water, such as an ordinary garden hose. A screen 21 is located in the connector 19 to prevent the introduction of particulate matter above a certain grain size into the dispenser body 15. Size of the mesh of screen 21 will depend upon the design of the passageways in the dispenser body 15—the screen 21 should prevent the introduction of any particulate matter that cannot freely pass through the passageways.

Connector 19 is affixed to a generally conventional hand-operated flow-regulating or control arrangement. This includes a suitable hand grip 23, on which an actuating trigger 25 has a pivot mounting 27. On one side of pivot mounting 27, actuating trigger 25 has a hand-engaged lever portion 29. On the other side of pivot mounting 27, actuating trigger 25 has a shorter actuating portion 31 connected to a flow regulating rod 33. By applying pressure to lever portion 29, the position of the flow regulating rod 33 may be controlled. A stepped setting member 35 may be utilized to maintain the flow regulating rod 33 in various predetermined positions.

Dispenser body 15 also includes a depending portion 37 to which container 17 is connected. In addition, the dispenser body 15 is provided with a suitable energy head, such as a nozzle 39.

While in some cases container 17 could be an integral portion of the dispenser body 15, there are certain advantages to having the container releasably attached to the dispenser body, which is the structure that will be discussed in connection with the preferred embodiments disclosed herein. As may be seen in FIG. 2, container 17 has been represented as a generally cylindrical can with an upper portion 41 adapted for connection to the depending portion 37 of the dispenser body 15.

In FIG. 2, the construction of the container 17 may be seen in greater detail. Container 17 may be formed of any suitable material, such as an appropriate metal or plastic. The upper portion 41 is shown as having a projecting portion 43 which, in this preferred embodiment, is generally cylindrical. Threads 45 are formed on the outer surface of extending portion 43 for attachment to dispenser body 15. Of course, the connection between container 17 and dispenser body 15 need not be mating threads, but may be any appropriate type of releasable attachment.

The upper end of projecting portion 43 is connected to an inwardly extending neck portion 47 by a solid web 49. Neck portion 47 has a first wider diameter section 51 and a second smaller diameter section 53. The interconnection between sections 51 and 53 forms a shoulder 55.

Provision is made in section 51 for discharge of additive fluid from container 17. While the additive fluid can take any appropriate form, in the preferred embodiments discussed herein the additive fluid will be treated as a liquid. At least one additive liquid exit opening 57 is provided in section 51, although in practice a plurality of additive liquid exit openings 57 will normally be employed. Additive liquid exit openings 57 should be sufficiently large to minimize the resistance to flow of the additive liquid therethrough.

A closure member 59 has a sealing portion 61 located over neck portion 47. A sealing rim or lip seal 62 is formed at the top of sealing portion 61, either by adding such a rim of suitable material or by constructing closure member 59 of a material having sufficient resiliency to form a seal under a sealing force. A blocking portion 63 of closure member 59 is connected to the sealing portion 61 by a base portion 65. Blocking portion 63 has a head 67 adapted to fit in section 53 of neck portion 47 with a sliding fit, and a smaller diameter leg 69 affixed to base 65, such as by pin 70 through smaller diameter portion 72. A suitable compression spring 71 extends along leg 69 between head 67 and an inwardly extending lip 73 at the bottom of section 53 of neck portion 47. Spring 71 forcibly biases closure member 59 toward the top of container 17.

A suitable flexible pressure member is located in container 17. This flexible pressure member is adapted to have water inserted into container 17 to apply a pressure thereto to force additive liquid from container 17, while separating the water from the additive liquid. In the preferred embodiments disclosed herein, the flexible pressure member takes the form of a flexible bag 75 connected to sealing portion 61 of closure member 59. This bag may be any suitable type of flexible material, but in these preferred embodiments a polyethylene bag has been employed. This polyethylene bag may be connected to closure member 59 in any suitable fashion, but it has been found that a suitable connection may be achieved by forming the top of bag 75 with a neck or opening having a slightly smaller diameter than the diameter of sealing portion 61 of closure member 59. The resilient force achieved by forcing the smaller diameter opening of the bag over the closure member has been found sufficient to maintain it on the closure member 59.

A metering plate 77 is located in section 49 of neck portion 47. Metering plate 77 is mounted in abutment with shoulder 55 and may be made of any suitable material, such as an appropriate plastic. In the most usual situation, metering plate 77 will be fixedly secured in abutment with shoulder 55. However, there may be circumstances in which it would be desired to change the metering plate 77 in order to obtain different concentrations of the additive liquid in the mixture. Such replaceability of the metering plate 77 may be accommodated.

Figures 4, 5:
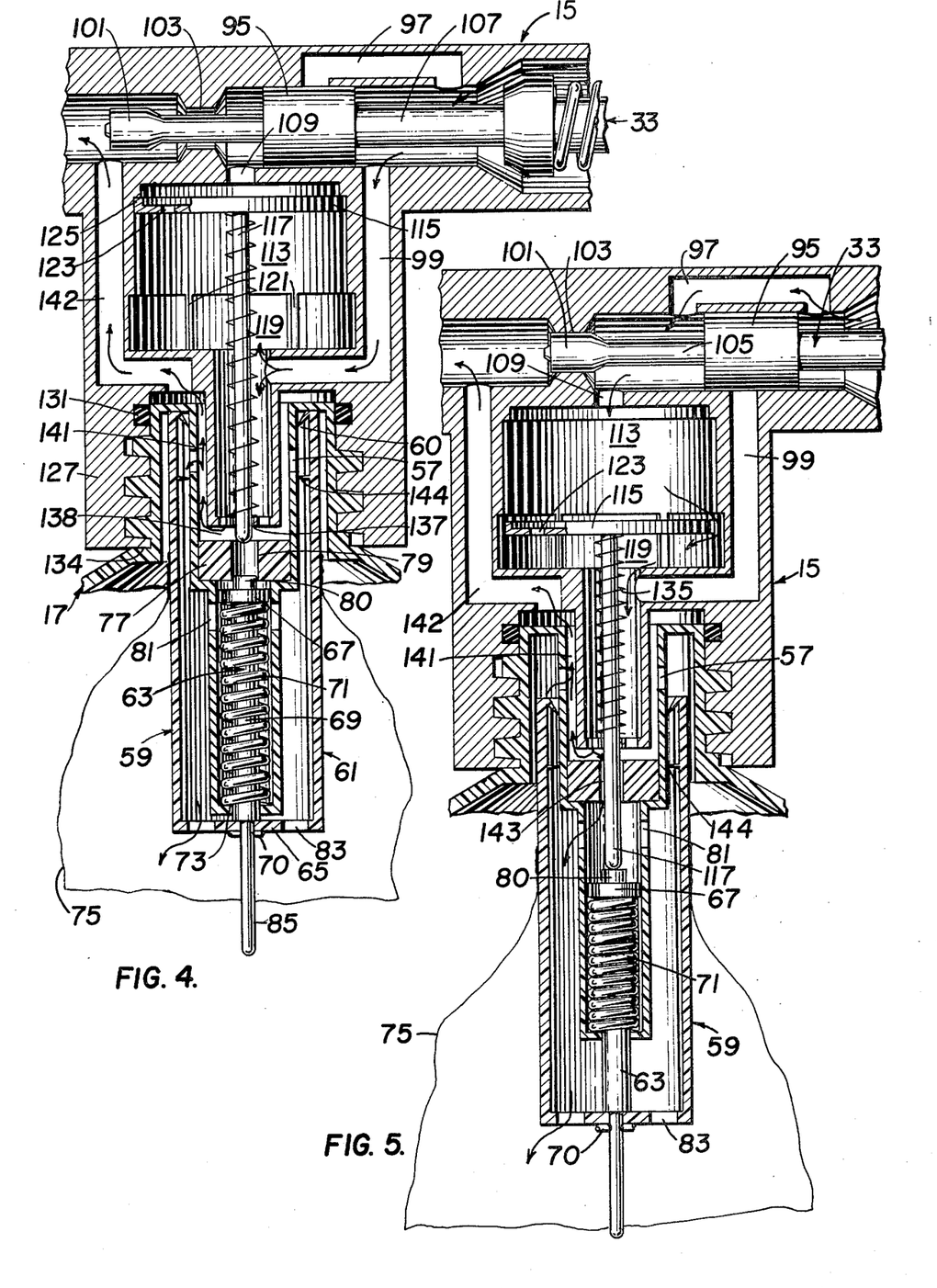
FIG. 4 is a partially cross-sectional, partially broken away view illustrating conditions upon initiating actuation of the dispensing assembly of FIG. 1.
FIG. 5 is a partially cross-sectional, partially broken away view corresponding to FIG. 4 illustrating conditions upon establishment of mixing conditions in the dispensing assembly.

An orifice 79 having a predetermined size is formed through the central portion of metering plate 77. An extension 80 of head 67 of the blocking portion 63 of closure member 59 will close or block the orifice 79 when closure member 59 is at or near its topmost position, as shown in FIGS. 2 and 4. Orifice 79, together with an opening or openings 81 in section 53 of neck portion 47 and opening or openings 83 in the base of closure member 59, provides a conduit for the insertion of water into flexible bag 75. As water is inserted into bag 75, it will expand and force additive liquid in the container, but outside the bag, to flow through the exit openings 57.

In some cases, the additive liquid will have a density greater than the density of water, and hence the water in bag 75 would tend to float on the additive liquid. As additional water is inserted into bag 75, it could expand to contact the walls of container 17 to prevent flow of the additive liquid out of container 17. Accordingly, an appropriate provision has to be made to prevent this from happening. One way would be to form vertical ridges on the inner surface of the container so that additive liquid flow paths could be maintained. However, in this preferred embodiment, a "dip stick" approach is employed, by providing an extension 85 of smaller diameter portion 72 of blocking portion 63 that extends below base 65 of sealing portion 61. Extension 85 is sufficiently long to engage the bottom of flexible bag 75 before the bag can expand sideways sufficiently to contact the walls of the container.

In order to provide an indication of the exhaustion of additive liquid from container 17, a spherical metallic ball 87 may be placed in the container. If there is additive liquid in the container, ball 87 will be free to move and shaking of container 17 will give an audible indication that there is still additive liquid in the container. On the other hand, if all of the additive liquid had been exhausted, flexible bag 75 will have expanded to hold the ball 87 in place so that shaking of the container will not give an audible signal.

FIG. 3 illustrates a preferred embodiment of a dispenser body 15 constructed in accordance with the present invention. This dispenser body 15 is constructed of a suitable material, such as a metal or strong plastic.

The flow regulating rod 33, position of which is controlled by the trigger 25, has a biasing spring 89 to urge rod 33 toward the left in the disposition of FIG. 3. Flow regulating rod 33 carries a valve body 91 adapted to mate with a corresponding valve seat 93 formed in the dispenser body 15. Valve body 91 determines the rate of flow of water into the dispenser body 15.

Spaced from valve body 91 along rod 33 there is an enlarged flow directing portion or slide 95. Slide 95 determines whether incoming water passing valve seat 93 will be conveyed through passageway 97 or passageway 99.

Finally, at the far end of rod 33 there is located an enlarged plug 101. Plug 101 is utilized to prevent water flow through the opening 103 under certain operating conditions. Plug 101 is connected to slide 95 by a smaller diameter shaft section 105 of rod 33, while slide 95 is connected to valve body 91 by a smaller diameter shaft section 107. Valve body 91, slide 95 and plug 101 are all preferably formed of a material having some resiliency to assure tight fit and prevent seizing.

An opening 109 extends from a central core 111 in which rod 33 is located to a pressure chamber 113. Pressure chamber 113 contains a plunger having a plunger disc 115 and a plunger stem 117. Water inserted through opening 109 creates a pressure in pressure chamber 113, which provides a pressure sensing location, to force plunger plate 115 into a secondary larger diameter chamber 119 located below pressure chamber 113. The flow of water around the edges of plunger disc 115 when it is in secondary chamber 119 reduces the downward force to balance the opposing forces with disc 115 stabilized at a position below the bottom of pressure chamber 113. Suitable extending guides 121 are located in secondary chamber 119 to properly position plunger plate 115 for a reentry to pressure chamber 113, without interfering with the flow of water around plunger plate 115 and through secondary chamber 119.

A pressure relief vent 123 extends through plunger plate 115. Vent 123 has a size such that gas in pressure chamber 113 can pass through the vent 123 without producing a force on plunger plate 115 sufficient to actuate the plunger. On the other hand, vent 123 is sufficiently small to preclude any significant effect on the force directed against plunger disc 115 by water pressure developed in pressure chamber 113. Vent 123 also provides pressure relief for pressure chamber 113 after operation of the dispensing assembly has been discontinued, thus preventing water from being held in chamber 113 by siphon action after container 17 is removed from dispenser body 15.

An extending ridge 125 is located about the outer periphery on the upper surface of plunger disc 115. The purpose of ridge 125 is to create a cup-like effect for the upper surface of plunger disc 115, and thus break up the flow pattern about the edge of the plunger disc, to produce a greater force thereon. Normally, ridge 125 is not required, as the force on a flat plunger disc is sufficient to drive the plunger disc into secondary chamber 119, which is all that is required. However, there are some instances in which it is necessary that a greater force be generated against plunger disc 115, as is discussed in more detail hereinafter, in which case ridge 125 is important.

A depending skirt portion 127 of the dispenser body 15 has threads 129 formed on the inner surface thereof. Threads 129 are adapted to engage mating threads 45 on the container 17 to join dispenser body 15 to container 17. A suitable sealing structure, such as a gasket 131, is positioned at the top of the inner surface of skirt 127 to provide a fluid-tight seal with the top of container 17 when container 17 is attached to dispenser body 15.

A sleeve 133 is generally annular and concentric with the skirt 127. The outer surface of sleeve 133 is spaced from the inner surface of skirt 127, so that the projecting portion 43 of container 17 may be received therebetween. Sleeve 133 is inserted into section 51 of neck portion 47 on container 17, with a shoulder 134 on container 17 limiting the extent to which sleeve 133 is inserted into neck portion 47. When dispenser body 15 is joined to container 17 in this fashion, plunger stem 117 is aligned to pass through orifice 79 in the metering plate 77 by a guide hole 136 in an inwardly extending lip 137 of sleeve 133. A desired spacing 138 (see FIG. 4) between lip 137 and metering plate 77 is established by the contact between the bottom of skirt 127 and shoulder 134.

A biasing force opposing activation of plunger disc 115 is provided by a compression spring 135. Spring 135 is located along plunger stem 117 between plunger disc 115 and the inwardly extending lip 137 at the bottom of sleeve 133. A suitable opening or openings 139 are formed in lip 137 of sleeve 133. Thus, water inserted into the pressure chamber 113 through opening 109 will force plunger disc 115 downwardly against spring 135, when the pressure in pressure chamber 113 exceeds a predetermined minimum value that is principally determined by the spring 135, given the dimensions of the pressure chamber 113, the plunger disc 115, the relief vent 123, etc. As this predetermined minimum pressure is established in pressure chamber 113, plunger disc 115 is forced down into secondary chamber 119, at which point a water flow is established through the pressure chamber 113, around the edge of plunger disc 115 into secondary chamber 119, and through sleeve 133 and openings 139 to impact against metering plate 77.

With reference to FIG. 5, it may be seen that a mixing passageway 141 is formed between the outer surface of sleeve 133 and the inner surface of section 51 of neck portion 47. This mixing passageway 141 continues on up through dispenser body 15 as passageway 142 for discharge of the mixture through the spray head 39. It may also be seen that the insertion of plunger stem 117 into orifice 79 of metering plate 77 forms a metering port 143. The dimensions of metering port 143 are established by an appropriate choice of the diameter of orifice 79 and the diameter of the plunger stem 117. For laminar flow conditions, the size or geometry of metering port 143, passageway 141 and spacing 138 are going to be the primary determinants of the metering characteristics. By varying these sizes, the desired metering ratio may be achieved, which will be maintained for all laminar flow rates.

By reference to the cross-sectional views of FIGS. 4 and 5, and the flow conditions indicated by the arrows therein, the operation of this invention may be more fully comprehended. In FIG. 4, flow regulating rod 33 has been actuated by the trigger 25 to a position that may be identified as the rinsing mode. If so desired, the dispensing assembly may be operated in this mode for as long a period as desired, such as by latching the setting device 35 to hold rod 33 at the position illustrated in FIG. 4.

In the FIG. 4 rinsing mode, central directing portion or slide 95 prevents flow of water through passageway 97, but permits flow of water about shaft portion 107 and through passageway 99. Hence, passageway 99 has been characterized as an alternative rinsing passageway, since it precludes the passage of any activating water to pressure chamber 113. Some water actually does reach pressure chamber 113, but the flow is in the opposite direction to that required to produce a pressure above plunger disc 115. As a matter of fact, this flow to the under side of plunger disc 115 is helpful in creating a rapid closure of container 17 after operation, as the condition of FIG. 4 is also encountered upon closing when valve body 91 is approaching valve seat 93.

Since the alternative rinsing passageway 99 conveys the incoming water directly to mixing passageway 141, it can be utilized to flush out any additive liquid that may be left in the mixing passageway, or the rest of the dispenser body, immediately preceding and following each operation of the dispensing apparatus. When the additive liquid is a substance that could have some harmful effects, such as an insecticide, this can prevent the discharge of overly strong concentrations of the insecticide. In addition, a clear water spray can be achieved by holding the device in the rinsing mode, if so desired.

During this time (i.e., the rinsing mode), extension 80 of head 67 of blocking portion 63 of closure member 59 is blocking the water flow through orifice 79. However, the flowing water can enter the additive liquid exit openings 57 and pass into flexible bag 75 past lip seal 144 and through openings 83. This means that flexible bag 75 will be pressurized prior to opening of container 17 for discharge of the additive liquid. The significance of this point is that when closure 59 is actuated to uncover exit openings 57 for discharge of the additive liquid, this additive liquid will already be under pressure so that no water will be able to enter the container to dilute the additive liquid. Such dilution would, of course, alter the concentration of the mixture produced upon subsequent operation of the dispensing assembly.

It should be noted that the water flow through openings 57 and 83 is past a lip seal 144. Lip seal 144 is sufficiently flexible to permit this water flow upon pressurization (or depressurization) of flexible bag 75, but seal 144 is sufficiently stiff to preclude water flow if the container is turned upside down when there is no pressurization (or depressurization) condition.

In FIG. 5, the flow directing rod 33 has been fully extended to the state of operation in which additive liquid is to be inserted into the flowing water. This may be termed the mixing mode. As may be seen, the central directing portion or slide 95 has now blocked off flow to auxiliary rinsing passageway 99, but has opened passageway 97 for flow therethrough. The water flowing through passageway 97 is blocked from passing to spray head 39 by plug 101, and thus the water flows about shaft section 105, through opening 109 into pressure chamber 113. When the pressure in pressure chamber 113 exceeds the predetermined minimum pressure, the magnitude of which is established primarily by spring 135 for a given configuration, plunger disc 115 is driven into secondary chamber 119 and plunger stem 117 activates closure member 59 by bearing against extension 80 of head 67 of blocking portion 63. This causes additive liquid exit openings 57 to be opened to permit the insertion of additive liquid into the water flowing through mixing passageway 141. The amount of additive liquid inserted into the water is determined by the water entering through metering port 143 and passing to the flexible bag 75 through openings 81 and 83. As exit openings 57 are made very large relative to metering port 143, the amount of additive liquid inserted into the water is determined solely by the water metered through metering port 143 (in conjuction with the geometries of spacing 138, passageway 141, etc), which will depend on the rate of flow of the water through the dispenser body 15, but is virtually independent of the characteristics of the additive liquid. Thus, the mixture of water and additive liquid passed to spray head 39 will remain substantially constant at all laminar flow conditions. In determining the concentration of the mixture produced by a given metering port 143, the size of other openings and passageways (e.g., spacing 138 and passageway 141) have to be taken into account (all of which, however, are readily accessible). However, assuming that these remain fixed, the metering port 143 can be viewed as the determinative factor in establishing the amount of additive liquid to be inserted into the water.

After the flow of water to the pressure chamber 113 is discontinued, a rinsing mode of operation, such as that discussed in FIG. 4, will again be initiated. It should also be noted that if there should be a water failure, there would still be a flushing of the dispenser body resulting from the water in flexible bag 75 being forced out (depressurizing the bag 75) through openings 83, past lip seal 144 and out openings 57, as a result of the contraction of the pressurized container 17.

Figure 6:
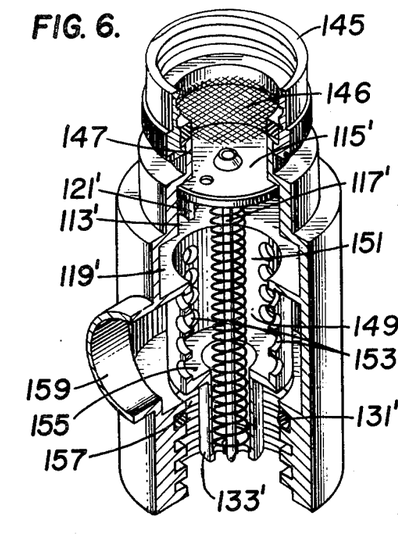
FIG. 6 is a partially broken away perspective view of the dispenser body of a second embodiment of this invention.

In some cases, it is desirable to use a very small amount of additive liquid in the water, one example being continuous fertilization of a lawn, golf course, or other sodded area. The concentration of the additive liquid in the water to permit utilization of this approach may be as small as one part in ten thousand, or perhaps even less. To accurately meter such a very small concentration is quite difficult, and hence a second embodiment of the present invention that may be utilized to achieve this result is illustrated in FIG. 6. For ease of reference, similar parts in this embodiment have been indicated by primed numerals corresponding to the numerals utilized to desribe the embodiment of FIGS. 1-5.

As may be seen, the embodiment of FIG. 6 utilizes a connection 145 to a source of water, such as a conventional hose, to direct the water into the pressure chamber 113' through a screen filter 146 in duct 147. The operation of plunger disc 115' and plunger stem 117' is essentially as described in connection with the embodiment of FIGS. 1-5. However, a tertiary chamber 149 is located below secondary chamber 119'. The wall 151 of chamber 149 is formed to permit unrestricted passage of the water that enters chamber 149. This could be a single large opening, but in this preferred embodiment a large number of openings 153 are formed in the wall 151 to provide essentially a sieve-like effect.

Sleeve 133' extends from the bottom 155 of chamber 149. Thus, while most of the water entering chamber 149 will pass out through openings 153, a certain portion will pass through sleeve 133'. By proper choice of the design characteristics, this proportion will be known and this proportion may be utilized to achieve the metering previously described. The water into which additive liquid is inserted as a result of the metering will be conveyed by a passageway 157 to an outlet conduit 159, where the water mixed with the additive liquid will be combined with the large volume of water passed directly into the outlet conduit 159 through openings 153. Hence, accurate metering of a small concentration of additive liquid will be achieved.

Figure 7:
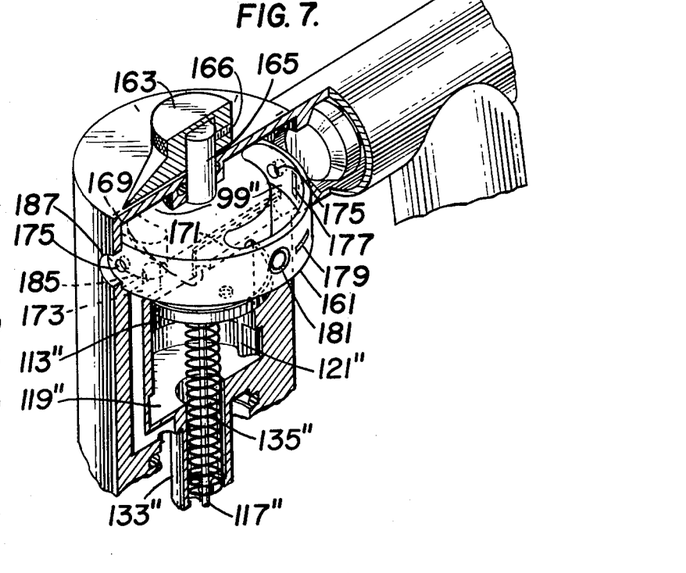
FIG. 7 is a partially broken away perspective view of the dispenser body of a third embodiment of this invention.

There are other types of situations in which it is desired to either follow or precede, or both, the discharge of a mixture of water and additive liquid by a rinse of clear water. An example of such a use would be where the additive liquid is a detergent or soap and the dispensing assembly is utilized to wash an automobile, house windows, house siding, etc. This may, of course, be achieved with the embodiment of FIGS. 1-5. However, it may also be desired to utilize a variety of different spray patterns. Accordingly, the embodiment of FIG. 7 provides such a capability. As in the case of the second embodiment of FIG. 6, parts corresponding to those described in connection with the FIGS. 1-5 embodiment are herein indicated by double primed numerals corresponding to the numerals utilized in describing the embodiment of FIGS. 1-5.

In the embodiment of FIG. 7, a special flow regulating rotary member 161 is employed. The rotary flow regulating member 161 may be manually adjusted by an appropriate control handle 163, which rotates member 161 through a shaft 165, to which it is affixed by a set screw 166. As may be seen, the alternative rinsing passageway 99" extends through and over the top of member 161 to convey water from inlet conduit 167. Water is inserted into pressure chamber 113" through an opening 169, which connects to inlet conduit 167 through a passageway 171. Water into which the additive liquid has been inserted is conveyed through a passageway 173.

Rotary member 161 has a plurality of discharge openings formed in the side thereof for discharging the mixture of water and additive liquid. Each of these discharge openings form a different discharge or spray pattern by means of differing pattern control arrangements. Corresponding discharge and pattern forming openings 175, 177, 179 and 181 are located on the opposite side of rotary member 161 for discharging clear water as a rinse. In this particular example, the discharge or spray pattern of discharge opening 175 is a heavy stream of water, the pattern of discharge opening 177 is a highly directionalized spray established by a narrow vertical slot, the pattern of discharge opening 179 is a highly directionalized spray formed by a narrow horizontal slot, and the pattern of discharge opening 181 is a dispersed spray about a central blocking member. Of course, while four types of discharge patterns are illustrated, any desired number could be utilized.

In the illustration of FIG. 7, it has been assumed that the control member 163 has been set to provide the heavy flow spray pattern of discharge opening 175 for a mixture of water and additive liquid. The mixture is conveyed through passageway 173 to an opening 185, which is connected with discharge opening 175, and the mixture is passed through the spray pattern arrangement to be discharged through a dispensing opening 187. If it were then desired to utilize a rinse spray of the same pattern, the control member 163 would be turned 180°, with the only difference being that the discharge would then be clear water passed through the rinsing passageway 99".

Figures 8, 9:
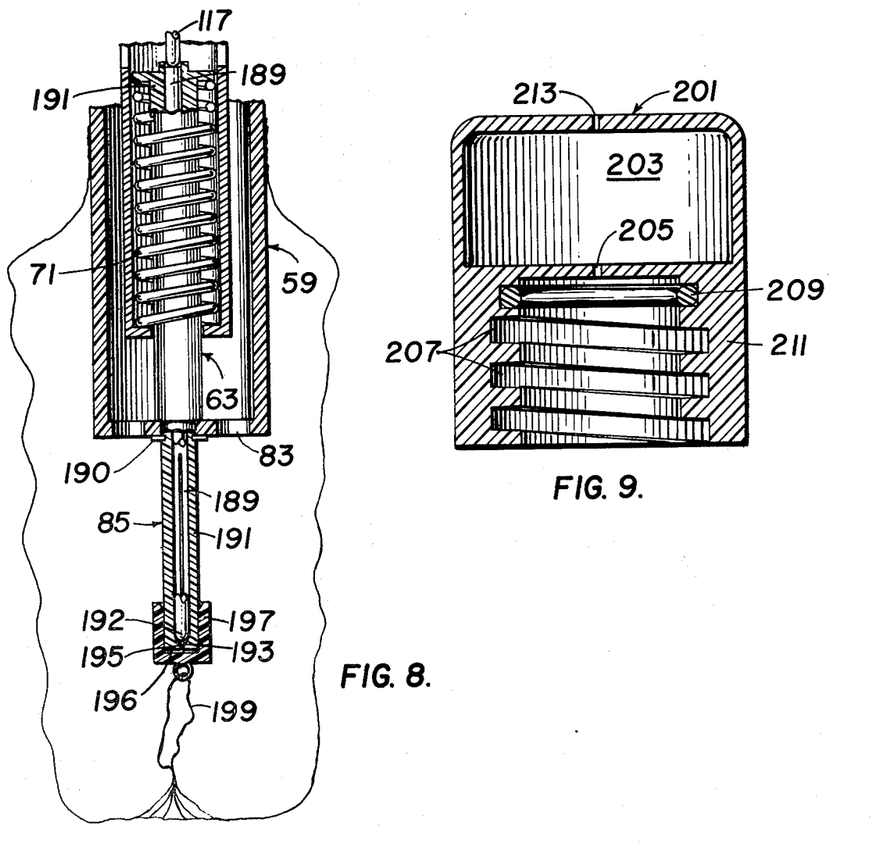
FIG. 8 is a partially cross-sectional, partially broken away view of a portion of the container of FIG. 2 illustrating a supplemental feature for preventing operation of the dispensing assembly upon exhaustion of the additive fluid.
FIG. 9 is a cross-sectional view of a cap that may be utilized with the container of FIG. 2.

FIG. 8 relates to a modification in container 17 to render the dispensing apparatus inoperative upon exhaustion of the additive liquid from container 17. In this structure, the blocking member 63, including extension 85, has been separated into an inner member 189, against which the plunger stem 117 bears, and an outer section 191, into which the inner section 189 is nested. As pin 70 could not be used with this structure, it has been replaced by a retaining ring 190, although any other suitable fastening arrangement to secure blocking member 63 to closure member 59 could be employed.

At the end of the inner section 189 in extension 85, an angled fit 193 is formed between the inner section 189 and outer section 191. A slot 195 extends through outer section 191 from the end 192 of inner section 189 to the end 196 of outer section 191. Slot 195 permits end 196 of outer section 191 to be spread apart to permit the passage of inner section 189 therethrough upon sufficient downward pressure against the angled fit 193. A cap 197 is placed over extension 85 to normally prevent the separation of end 196 of outer section 191. A flexible, generally inelastic lead 199 extends from cap 197 to the bottom of the flexible bag 75.

Upon exhaustion of the additive liquid in container 17, flexible bag 75 will expand to the bottom of the container and pull cap 197 off the extension 85. At this point, the pressure in pressure chamber 113 will push the plunger stem 117 against inner section 189 with sufficient force to separate end 196 and permit the passage of inner section 189 through outer section 191 of blocking member 63. This will result in the plunger disc 115 being forced to the bottom of the secondary chamber 119 to prevent the flow of water into sleeve 133. This wall, of course, preclude dispensing of the water and additive liquid mixture from the dispensing apparatus.

It may be noted that the ridge 125 on plunger disc 115 is utilized to insure that the water inserted into pressure chamber 113 will force the plunger disc to close off sleeve 133. Without the use of ridge 125, in some cases the flow pattern of the water around plunger disc 115 could be such as to prevent the plunger disc from being forced to the bottom of the secondary chamber 119. As an aside, it may be noted that in the embodiment of FIG. 6, the operation of this device would result in sealing off water flow into tertiary chamber 149, rather than directly into the sleeve 133'.

A cap 201 for preventing rupture of container 17 or ejection of water from the container, as a result of water freezing in the flexible pressure bag 75, is illustrated in FIG. 9. A water retaining cavity 203 is formed at the top of cap 201. Retaining cavity 203 is connected to a lower portion of the cap by a suitable passageway 205. The lower portion of cap 201 may be connected to container 17 by a suitable connecting arrangement, such as threads 207. The inner surface of neck portion 47 of container 17 engages a sealing ring 209. Insulation 211, which may be the plastic of the cap, is placed about the area that would be occupied by the projecting portion 43 and neck portion 47 of the container when cap 201 was affixed thereto. Insulation 211 insures that freezing will last occcur at the top of container 17, so that any freezing of water in bag 75 will force excess water out through orifice 79 and into retaining cavity 203 of cap 201 through the passageway 205. A suitable vent 213 is formed in the top of cap 201 to prevent pressure buildup in the retaining cavity 203 from preventing the flow of water through passageway 205.

It should be understood that various modifications, changes and variations may be made in the arrangement, operation and details of construction of the elements disclosed herein without departing from the spirit and scope of this invention.

We claim:

1. A dispensing assembly for inserting a desired amount of an additive liquid into a flowing fluid and discharging the resultant mixture comprising:
   a container in which the additive liquid is stored;
   closure means for said container;
   closure bias means to forcibly urge said closure means to maintain said container in a closed state to prevent escape of the additive liquid;
   a flexible pressure member located in said container;
   a dispenser body attached to said container and adapted to have the flowing fluid inserted thereinto and passed therethrough;
   activating means responsive to the pressure produced in said dispenser body by the flowing fluid at a pressure sensing location to overcome the force of said closure bias means and open said container for release of the additive liquid only when the flowing fluid establishes a pressure at said pressure sensing location in said dispenser body that is in excess of a predetermined minimum pressure; and
   additive control means to pass a portion of the flowing fluid into said container through a metering port to bear against said flexible pressure member and force the additive liquid out of an additive liquid exit opening and into the flowing fluid passing through said dispenser body at a rate determined by the flow rate of the flowing fluid in said dispenser body, so that the resultant mixture will always have the desired composition.

2. A dispensing assembly as claimed in claim 1 wherein said additive liquid exit opening is large relative to said metering port so that the amount of additive liquid inserted into the flowing fluid is determined solely by the flowing fluid independently of the characteristics of the additive liquid.

3. A dispensing assembly as claimed in claim 1 and further comprising connecting means to releasably attach said dispenser body to said container, separation of said container from said dispenser body resulting in the forcible closure of the container by said closure bias means to prevent escape of the additive liquid regardless of the flowing fluid pressure in said dispenser body.

4. A dispensing assembly as claimed in claim 1 and further comprising flow regulating means to determine the flow of the flowing fluid into said dispenser body and to selectively direct the flowing fluid to and away from said pressure sensing location in said dispenser body, to thus selectively establish a mixing mode in which additive liquid is inserted into the flowing fluid and a rinsing mode in which the additive liquid is not inserted into the flowing fluid.

5. A dispensing assembly as claimed in claim 4 wherein said flow regulating means automatically directs the flowing fluid away from said pressure sensing location immediately preceding and immediately following opening of said container in order to flush out said dispenser body before and after operation in said mixing mode.

6. A dispensing assembly as claimed in claim 4 wherein said flow regulating means may be selectively maintained in said rinsing mode for any desired period of time.

7. A dispensing assembly as claimed in claim 6 wherein said flow regulating means provides a plurality of different discharge patterns that may be chosen as desired.

8. A dispensing assembly as claimed in claim 1 wherein said flexible pressure member comprises a flexible bag into which the flowing fluid is inserted.

9. A dispensing assembly as claimed in claim 1 wherein said activating means is not operative to open said container until sufficient pressure has been established against said flexible pressure member to prevent any flowing fluid from entering said second opening and diluting the additive liquid.

10. A dispensing assembly as claimed in claim 1 wherein said metering port is formed upon said activating means opening said container.

11. A dispensing assembly as claimed in claim 1 and further comprising bypass means to convey a major portion of the flowing fluid to a point where flowing fluid into which the additive liquid has been inserted is combined with the major portion of the flowing fluid.

12. A dispensing assembly for inserting a desired amount of an additive liquid into a flowing fluid and discharging the resultant mixture comprising:
   a container in which the additive liquid is stored;
   a flexible pressure member located in said container;
   conduit means extending into said container to introduce the flowing fluid into said container and to bring the flowing fluid into contact with said pressure member to apply pressure to the additive liquid;
   an additive liquid exit opening formed in said container for passing additive liquid out of said container when pressure is applied by said pressure member;
   a closure member;
   closure bias means urging said closure member to forcibly block said conduit means and seal said additive liquid exit opening;
   a dispenser body into which the flowing fluid is inserted;
   connecting means to releasably attach said dispenser body to said container;
   a flowing fluid passageway positioned to convey the flowing fluid to receive additive liquid from said exit opening when said dispenser body and said container are attached;

activating means to move said closure member against said closure bias means to unblock said conduit means and open said additive liquid exit opening, when said dispenser body is connected to said container and said activating means is energized for causing additive liquid to be inserted into said flowing fluid, deenergization of said activating means permitting flowing fluid alone to pass through said dispenser body; and additive control means in said conduit means to determine the portion of said flowing fluid to be introduced into said container to contact said flexible pressure member and hence establish the amount of additive liquid to be inserted into the flowing fluid to thereby establish the composition of the discharged mixture.

13. A dispensing assembly as claimed in claim 12 wherein said flexible pressure member comprises a flexible bag into which the flowing fluid is inserted.

14. A dispensing assembly as claimed in claim 13 and further comprising positioning means to prevent said flexible bag from blocking discharge of the additive liquid from said container.

15. A dispensing assembly as claimed in claim 12 wherein said additive control means comprises a metering port.

16. A dispensing assembly as claimed in claim 15 wherein said additive liquid exit opening is large relative to said metering port so that the amount of additive liquid inserted into the flowing fluid is dependent upon the rate of flow of the flowing fluid but independent of the characteristics of the additive liquid.

17. A dispensing assembly as claimed in claim 12 wherein at least a portion of said flowing fluid passageway is formed between adjacent surfaces of said container and said dispenser body when said container is attached to said dispenser body.

18. A dispensing assembly as claimed in claim 12 and further comprising additive liquid exhaustion sensing means to indicate where all of the additive fluid has been discharged from the container.

19. A dispensing assembly as claimed in claim 18 wherein said additive liquid exhaustion sensing means causes said container to be closed and prevents discharge of at least a major portion of the flowing fluid from the dispensing assembly when all of the additive liquid has been discharged from said container.

20. A dispensing assembly as claimed in claim 12 wherein:

said activating means comprises a flowing fluid pressure energized plunger;

said plunger is energized by the flowing fluid pressure against activating bias means; and said additive control means comprises a metering port formed about a stem of said plunger inserted into said conduit means upon energization of said plunger.

21. A dispensing assembly for inserting a desired amount of an additive liquid into flowing water and discharging the resultant mixture comprising:

a container in which the additive liquid is stored;

a flexible pressure bag positioned in said container to force additive liquid out of said container upon expansion of said pressure bag;

an annular neck portion extending inwardly from the top of said container;

a metering plate positioned in said annular neck portion intermediate the ends thereof, said metering plate having an orifice extending therethrough;

at least one additive liquid exit opening formed in said neck portion adjacent the top thereof;

a closure member mounted to reciprocably slide over said neck portion to cover and uncover said additive liquid exit opening and to block and unblock said orifice in said metering plate;

closure bias means to urge said closure member to cover said additive liquid exit opening to block said orifice in said metering plate;

a dispenser body comprising a water inlet and mixture discharging section and a depending container engaging section;

connecting means to releasably attach said container engaging section of said dispenser body to said container;

a water pressure chamber formed in said dispenser body;

a plunger having a plunger disc and an attached plunger stem located in said pressure chamber, said plunger being activated upon establishment by the flowing water of a predetermined minimum pressure in said pressure chamber to activate said closure member to open said additive exit opening;

activating bias means urging said plunger in a direction opposing the water pressure in said pressure chamber with a force equal to the force exerted upon said plunger disc by said predetermined minimum pressure;

a metering port formed about said plunger stem, when said plunger stem is located in said orifice in said metering plate upon actuation of said plunger, to determine the amount of water to be inserted into said flexible pressure bag for forcing out the additive liquid when said closure member is activated by said plunger to open said exit opening;

flow regulating means in said water inlet and mixture discharging section of said dispenser body to control the flow rate of water into said pressure chamber;

a mixing passageway conveying water from said pressure chamber to said metering port and past said additive fluid exit opening where the additive liquid is inserted into the water to form the mixture; and a spray head in said water inlet and mixture discharging section to receive the mixture from said mixing passageway and to appropriately discharge it.

22. A dispensing assembly as claimed in claim 21 and further comprising an alternative rinsing passageway to convey water to said mixing passageway while bypassing said pressure chamber, said flow regulating means automatically causing water to pass through said alternative rinsing passageway to rinse said mixing passageway and in said spray head before and after water is inserted into said pressure chamber.

23. A dispensing assembly as claimed in claim 21 wherein said connecting means comprises threads formed on the interior surface of an annular depending skirt of said dispenser body to engage mating threads formed on said container.

24. A dispensing assembly as claimed in claim 23 wherein said neck portion comprises:

a first larger diameter section connected to said container and having said additive liquid exit opening formed therethrough; and a second smaller diameter section located below said first section, the connection between said first and second sections forming a shoulder upon which said metering plate is located.

25. A dispensing assembly as claimed in claim 23 wherein said closure member comprises:
   an outer sealing portion to fit over said neck portion, said sealing portion being generally annular with a base; and
   an inner blocking portion to fit inside said neck portion, said blocking portion having a leg attached to said base of said sealing portion and a larger diameter head to fit over said orifice in said metering plate, said closure biasing means being a compression spring extending between said head of said blocking portion and an inwardly extending lip on the bottom of said neck portion.

26. A dispensing assembly as claimed in claim 25 wherein said sealing portion of said closure member has a sealing rim at one end thereof to bear against said container and said neck portion, the rest of said sealing portion being slightly spaced from said neck portion so that while said sealing rim prevents the escape of the additive liquid from said exit opening, water can enter in through said exit opening and pass into said flexible pressure bag through an appropriate opening in said base of said sealing portion.

27. A dispensing assembly as claimed in claim 25 and further comprising an extension of said leg of said blocking portion beyond said base of said sealing portion to prevent said flexible pressure bag from expanding to the walls of said container and trapping additive liquid in the bottom of said container.

28. A dispensing assembly as claimed in claim 25 wherein said blocking portion is separated into an inner section against which said plunger stem bears and an outer section in which said inner section is positioned, and further comprising:
   an extension of said blocking member beyond said base of said sealing portion, the end of said extension normally preventing passage of said inner section but being split to permit passage of said inner section therethrough when forcibly separated;
   a cap member located over said extension to prevent separation of said extension and hence prevent removal of said inner section;
   a generally inelastic flexible lead extending from said cap member to the bottom of said flexible pressure bag, exhaustion of the additive liquid resulting in said cap member being pulled from said extension by means of said lead to permit said plunger stem to force out said inner section; and
   an annular upwardly extending ridge formed on said pressure plate to cause the pressure in said pressure chamber to force said plunger stem down through said blocking member to permit said plunger disc to prevent passage of the water beyond said pressure chamber.

29. A dispensing assembly as claimed in claim 21 and further comprising a pressure relief vent extending through said plunger disc, said relief vent having a size to pass a gas in said pressure chamber without actuating said plunger but without preventing the development of water pressure in said pressure chamber.

30. A dispensing assembly as claimed in claim 21 wherein:
   said dispenser body further comprises a generally annular sleeve extending concentric with said depending skirt and spaced inwardly therefrom;
   said sleeve is insertable into said neck portion of said container to form at least a portion of said mixing passageway therebetween;
   said plunger stem extends through said sleeve and said neck portion to enter and pass through said orifice in said metering plate; and
   said activating bias means is a compression spring extending along said plunger stem between said plunger disc and an inwardly extending lower lip of said sleeve.

31. A dispensing assembly as claimed in claim 30 and further comprising a secondary larger chamber below said pressure chamber so that upon production of pressure in said pressure chamber in excess of said predetermined minimum pressure said plunger is activated to locate said plunger plate in said secondary larger chamber, water flowing through said pressure chamber, around said pressure plate in said secondary larger chamber and through said annular sleeve.

32. A dispensing assembly as claimed in claim 31 and further comprising:
   a tertiary chamber located below said secondary chamber, said sleeve extending above the bottom of said tertiary chamber; and
   water transmitting means to convey a major portion of the water entering said tertiary chamber directly to said spray head.

33. A dispensing assembly as claimed in claim 21 and further comprising:
   an alternative rinsing passageway to convey water directly to said spray head, said flow regulating means selectively establishing a mixing mode by directing water to said pressure chamber and a rinsing mode by directing water to said alternative rinsing passageway;
   a plurality of discharge patterns; and
   manual selecting means for selectively choosing between said mixing mode and said rinsing mode and the type of discharge pattern desired.

34. A dispensing assembly for inserting a desired amount of an additive liquid into flowing water and discharging the resultant mixture comprising:
   a container in which the additive liquid is stored;
   an upwardly extending projecting portion formed at the top of said container and having a smaller diameter than said container;
   threads formed on the external surface of said projecting portion;
   an annular neck portion extending into said container through said projecting portion, said neck portion having a first larger diameter section having one end connected to the top of said projecting portion by a solid web and a second smaller diameter section located below said first section, the connection between said first and said second sections forming a shoulder;
   at least one additive liquid exit opening formed in said first section of said neck portion;
   at least one water opening formed in said second section of said neck portion;
   a closure member having an outer sealing portion to fit over said first section of said neck portion and an inner blocking portion to fit inside said second section of said neck portion, said blocking portion of said closure member having a head that slides with a snug fit in said second section of said neck portion and a smaller diameter leg that is attached to the base of said sealing portion, said blocking portion extending upwardly from said base of said sealing portion;

a closure biasing compression spring located between said head of said blocking portion and an inwardly extending lip at the bottom of said second section of said neck portion;

a sealing rim formed at the top end of said sealing portion of said closure member to slide over said first section of said neck portion with a liquid sealing fit while the remainder of said sealing portion has a greater diameter than the diameter of said first section of said neck portion to permit water flow between said first section of said neck portion and the internal surface of said sealing portion of said closure member, said sealing rim forming a liquid-tight seal with said first section of said neck portion and said connecting web of said container under the urging of said closure biasing spring, at least one water opening formed in said base of said sealing portion of said closure member;

a flexible pressure bag surrounding the bottom portion of said closure member and attached to the external surface of said sealing portion of said closure member with a liquid-tight seal;

an extension of said leg of said blocking portion of said closure member extending into said flexible bag beyond said base of said sealing portion to prevent said flexible pressure bag from expanding to the walls of said container and trapping additive liquid in the bottom of said container;

a metering plate located in said first section of said neck portion in abutment with said shoulder;

an orifice formed through said metering plate from the interior of said first section to the interior of said second section of said neck portion;

a dispenser body into which the water is inserted and from which the resultant mixture is discharged, said dispenser body having an annular depending skirt with threads formed on the internal surface thereof to engage mating threads on said projecting portion of said container to attach said dispenser body to said container;

a primary water pressure chamber formed in said dispenser body;

a plunger having a plunger disc located in said water pressure chamber, said plunger disc being free for movement in said pressure chamber but having a close enough fit to provide a generally water-tight sliding seal;

a pressure relief vent extending through said plunger disc, said relief vent having a size to pass a gas in said pressure chamber without actuating said plunger but without preventing the development of water pressure in said pressure chamber;

a secondary larger chamber located below said pressure chamber into which said pressure plate is forced upon the establishment of a water pressure in said pressure chamber that is in excess of a predetermined minimum pressure;

a plurality of extending guides formed in said secondary chamber to properly position said plunger plate for return to said pressure chamber;

a generally annular sleeve extending from said secondary chamber generally concentric with said depending skirt of said dispenser body and adapted to fit into said first section of said neck portion of said container, a mixing passageway being formed between the external surface of said sleeve and the internal surface of said first section of said neck portion;

a plunger stem attached to said plunger disc and extending through said sleeve, said plunger stem being aligned to fit into said orifice in said metering plate to form a metering port when said pressure disc is forced toward said secondary chamber;

an activating bias spring located along said plunger stem between said plunger disc and an inwardly extending lower lip of said sleeve;

at least one water opening formed in said inwardly extending lip of said sleeve; and a passageway to convey water to said pressure chamber.

35. A dispensing assembly as claimed in claim 34 and further comprising a spherical ball located in said container outside of said flexible pressure bag, said spherical ball being held in position by the expansion of said flexible pressure bag when all of the additive liquid has been discharged from the container.

36. A dispensing assembly as claimed in claim 34 wherein:
said blocking portion is separated into an inner section against which said plunger stem bears in an outer generally annular section in which said inner section is positioned;
said extension normally prevents passage of said inner section but is split to permit passage of said inner section therethrough when forcibly separated;
a cap member is located over the end of said extension to prevent separation of said extension and hence prevent passage of said inner section;
a generally inelastic flexible lead extends from said cap member to the bottom of said flexible pressure bag, exhaustion of the additive liquid resulting in said cap member being pulled from said extension by means of said lead to permit said plunger stem to force out said inner section; and
an annular upwardly extending ridge formed on said pressure plate to cause the pressure in said pressure chamber to force said plunger stem down through said blocking member to permit said plunger plate to prevent passage of the water beyond said pressure chamber.

37. A dispensing assembly as claimed in claim 34 and further comprising:
an alternative rinsing passageway for conveying water through said dispenser body conveying water to said pressure chamber to actuate said plunger disc; and
water flow directing means to selectively direct water through said alternative rinsing passageway and said pressure chamber.

38. A dispensing assembly as claimed in claim 37 wherein said alternative rinsing passageway conveys the water to said mixing passageway to flush out any undesired materials and said water flow directing means automatically directs water through said rinsing passageway before water is directed to said pressure chamber and after the flow of water to said pressure chamber has been discontinued.

39. A dispensing assembly as claimed in claim 37 wherein said water flow regulating means comprises:
an extending rod;

a valve body located on said rod and normally biased into engagement with a corresponding valve seat to prevent insertion of water into said dispenser body;

a central flow directing portion formed on said rod to direct water through said alternative rinsing passageway upon initial separation of said valve body from said valve seat and to direct the water flow to said pressure chamber upon further separation of said valve body from said valve seat; and an enlarged sealing plug formed at the end of said rod opposite said valve body to prevent the direct discharge of water when water is being directed to said pressure chamber.

40. A dispensing assembly as claimed in claim 37 wherein:

said water flow directing means comprises a generally cylindrical rotary member;

said alternative rinsing passageway is located over the top of said rotary member directly to said spray head;

two sets of a plurality of different discharge characteristic openings are formed on opposing sides of said rotary member, one of said sets of said discharge openings leading to the top of said rotary member while the other set leads to the bottom thereof; and manual selecting means to turn said rotary member to select between a mixing mode and a rinsing mode and to select the desired discharge characteristics.

41. A dispensing assembly as claimed in claim 34 wherein:

a tertiary chamber is located below said secondary chamber;

said sleeve extends upward from the bottom of said tertiary chamber; and a plurality of openings are formed in the walls of said tertiary chamber to convey a major portion of the water entering said tertiary chamber directly to said spray head.

42. A container for storing an additive liquid to be inserted into a flowing fluid to produce a desired mixture comprising:

connecting means on the container for selectively attaching the container to a dispenser body through which the flowing fluid passes;

at least one additive liquid exit opening located in the container;

a closure member to selectively open and close said exit opening;

closure bias means for forcibly maintain said closure member in a position to seal said exit opening unless it is desired to insert additive liquid into the flowing fluid;

activating force receiving means associated with said closure member and adapted to respond to an activating force from the dispenser body to overcome the force of said closure bias means and open said exit opening only upon the flowing fluid establishing a pressure in the dispensing body that is in excess of a predetermined minimum pressure;

conduit means to introduce flowing fluid into the container; and a flexible pressure member in the container to force additive liquid out of the container in response to the introduction of flowing fluid through said conduit means when said closure member has been actuated to open said additive liquid exit opening.

43. A container for storing an additive liquid to be inserted into flowing water to produce the desired mixture comprising:

a flexible pressure bag positioned in said container to force additive liquid out of said container upon expansion of said pressure bag;

an annular neck portion extending inwardly from the top of said container;

a metering plate positioned in said annular neck portion intermediate the ends thereof, said metering plate having an orifice extending therethrough;

at least one additive liquid exit opening formed in said neck portion adjacent the top thereof;

a closure member mounted to reciprocably slide over said neck portion to cover and uncover said additive liquid exit opening and to block and unblock said orifice in said metering plate; and closure bias means to urge said closure member to cover said additive liquid exit opening to block said orifice in said metering plate.

44. A container as claimed in claim 43 and further comprising connecting means on the container to permit attachment of the container to an appropriate dispenser body.

45. A container as claimed in claim 43 wherein said neck portion comprises:

a first larger diameter section connected to said container and having said additive liquid exit opening formed therethrough; and a second smaller diameter section located below said first section, the connection between said first and said second sections forming a shoulder upon which said metering plate is located.

46. A container as claimed in claim 43 wherein said closure member comprises:

an outer sealing portion to fit over said neck portion, said sealing portion being generally annular with an inwardly extending base; and an inner blocking portion to fit inside said neck portion, said blocking portion having a leg attached to said base of said sealing portion and a larger diameter head to fit over said orifice in said metering plate, said closure biasing means being a compression spring extending between said head of said blocking portion and an inwardly extending lip on the bottom of said neck portion.

47. A container as claimed in claim 46 wherein said sealing portion of said closure member has a sealing rim on one end thereof to bear against said container and said neck portion, the rest of said sealing portion being slightly spaced from said neck portion so that while said sealing rim prevents the escape of the additive liquid from said exit opening, water can enter in through said exit opening and pass into said flexible pressure bag through an appropriate opening in said base of said sealing portion.

48. A container as claimed in claim 46 and further comprising an extension of said leg of said blocking portion beyond said base of said sealing portion to prevent said flexible pressure bag from expanding to the walls of said container and trapping additive liquid in the bottom of the container.

49. A container as claimed in claim 46 wherein said blocking portion is separated into an inner section and an outer section in which the inner section is positioned and further comprising:

an extension of said blocking member beyond said base of said sealing portion, the end of said extension normally preventing passage of said inner section but being split to permit passage of said inner section therethrough when forcibly separated;

a cap member located over said extension to prevent separation of said extension and hence prevent removal of said inner section; and a generally inelastic flexible lead extending from said cap member to the bottom of said flexible pressure bag, exhaustion of the additive liquid resulting in said cap member being pulled from said extension by means of said lead to permit said inner section to be forced out of said outer section.

50. A container as claimed in claim 46 and further including a cap for said container comprising:

attaching means to fasten the cap to the container;

a water receiving cavity formed in the top portion of the cap;

conveying means for transferring water from said flexible pressure bag to said water receiving cavity when the cap is fastened to the container; and insulating material to enclose the top of the container when the cap is fastened thereto, whereby freezing of the water in the container forces excess liquid water into said water receiving cavity.

51. A container for storing an additive liquid to be inserted into flowing water to produce a desired mixture:

an upwardly extending projecting portion formed at the top of the container and having a smaller diameter than the container;

threads formed on the external surface of said projecting portion;

an annular neck portion extending into the container through said projecting portion, said neck portion having a first larger diameter section having one end connected to the top of said projecting portion by a solid web and a second smaller diameter section located below said first section, the connection between said first and said second sections forming a shoulder;

at least one additive liquid exit opening formed in said first section of said neck portion;

at least one water opening formed in said second section of said neck portion;

a closure member having an outer sealing portion to fit over said first section of said neck portion and an inner blocking portion to fit inside said second section of said neck portion, said blocking portion of said closure member having a head that slides with a snug fit in said second section of said neck portion and a smaller diameter leg that is attached to the base of said sealing portion, said blocking portion extending upwardly from said base of said sealing portion;

a closure biasing compression spring located between said head of said blocking portion and an inwardly extending lip at the bottom of said second section of said neck portion;

a sealing rim formed at the top end of said sealing portion of said closure member to slide over said first section of said neck portion with a liquid sealing fit while the remainder of said sealing portion has a greater diameter than the diameter of said first section of said neck portion to permit water flow between said first section of said neck portion and the internal surface of said sealing portion of said closure member, said sealing rim forming a liquid-tight seal with said first section of said neck portion and said connecting web of said container under the urging of said closure biasing spring, at least one water opening formed in said base of said sealing portion of said closure member;

a flexible pressure bag surrounding the bottom portion of said closure member and attached to the external surface of said sealing portion of said closure member with a liquid-tight seal;

an extension of said leg of said blocking portion of said closure member extending into said flexible bag beyond said base of said sealing portion to prevent said flexible pressure bag from expanding to the walls of said container and trapping additive liquid in the bottom of the container;

a metering plate located in said first section of said neck portion in abutment with said shoulder; and an orifice formed through said metering plate from the interior of said first section to the interior of said second section of said neck portion.

52. A dispenser body into which a flowing fluid is to be inserted for mixture with an additive liquid and discharge of the resultant mixture comprising:

connecting means on the dispenser body for selectively attaching the dispenser body to a container storing the additive liquid;

a pressure sensing location to which all of the flowing fluid is directed for effecting insertion of the additive liquid into the flowing fluid;

activating means responsive to the pressure produced at said pressure sensing location by the flowing fluid;

activating bias means urging said activating means in opposition to the pressure produced at said pressure sensing location, production of a pressure in excess of a predetermined minimum pressure at said pressure sensing location initiating response of said activating means against the opposition of said activating biasing means to open the container for releasing additive liquid; and flow regulating means to control the establishment of pressure at said pressure sensing location.

53. A dispenser body to receive flowing water into which an additive liquid is to be inserted and to discharge the resultant mixture comprising:

connecting means on the dispenser body for selectively attaching the dispenser body to a container storing the additive liquid;

a water pressure chamber formed therein;

a primary flow passageway to convey all of the flowing water to said water pressure chamber to effect insertion of the additive liquid into the flowing water;

a plunger having a plunger disc and an attached plunger stem located in said pressure chamber, said plunger being activated upon establishment by the flowing water of a predetermined minimum pressure in said pressure chamber to cause said plunger stem to open the container for release of the additive liquid;

flow regulating means to control the flow of water into said pressure chamber;

activating bias means urging said plunger in the direction opposing the water pressure in said pressure chamber with a force equal to the force exerted upon said plunger disc by said predetermined minimum pressure;

a spray head to discharge the mixture of water and additive liquid; and an alternative rinsing passageway to pass all of the flowing water through the dispenser body and out said spray head while bypassing said pressure chamber before and after dispensing the mixture of water and additive liquid.

54. A dispenser body as claimed in claim 53 wherein said flow regulating means automatically causes water to pass through said alternative rinsing passageway to flush the dispenser body before and after water is inserted into said pressure chamber.

55. A dispenser body as claimed in claim 54 wherein said connecting means comprises threads formed on the interior surface of an annular depending skirt of the dispenser body.

56. A dispenser body as claimed in claim 54 and further comprising a pressure relief vent extending through said plunger disc, said relief vent having a size to pass a gas in said pressure chamber without actuating said plunger while not preventing the development of water pressure in said pressure chamber.

57. A dispenser body to receive flowing water into which an additive liquid is to be inserted and to discharge the resultant mixture comprising:
a water pressure chamber formed therein;
a plunger having a plunger disc and an attached plunger stem located in said pressure chamber, said plunger being activated upon establishment by the flowing water of a predetermined minimum pressure in said pressure chamber;
flow regulating means to control the flow of water into said pressure chamber;
an annular depending skirt having threads formed on the interior surface thereof;
a generally annular sleeve extending concentrically with said depending skirt and spaced inwardly therefrom, said plunger stem extending through said sleeve;
a compression spring extending along said plunger stem between said plunger disc and an inwardly extending lower lip of said sleeve, said compression spring urging said plunger in the direction opposing the water pressure in said pressure chamber with a force equal to the force exerted upon said plunger disc by said predetermined minimum pressure;
a spray head to discharge the mixture of water and additive liquid; and
an alternative rinsing passageway to pass water through the dispenser body and out said spray head while bypassing said pressure chamber, said flow regulating means automatically causing water to pass through said alternative rinsing passageway to flush the dispenser body before and after water is inserted into said pressure chamber.

58. A dispenser body for receiving flowing water into which an additive liquid is to be inserted and for discharging the resultant mixture comprising:
an annular depending skirt with threads formed on the internal surface thereof for use in connecting the dispenser body to a suitable container for the additive fluid;
a primary water pressure chamber formed in the dispenser body;
a plunger having a plunger disc located in said water pressure chamber, said plunger disc being free for movement in said pressure chamber but having a close enough fit to provide a generally water-tight sliding seal;
a pressure relief vent extending through said plunger disc, said relief vent having a size to pass a gas in said pressure chamber without actuating said plunger but without preventing the development of water pressure in said pressure chamber;
a secondary larger chamber located below said pressure chamber into which said pressure plate is forced upon the establishment of a water pressure in said pressure chamber that is in excess of a predetermined minimum pressure;
a plurality of extending guides formed in said secondary chamber to properly position said plunger plate for return to said pressure chamber;
a generally annular sleeve extending from said secondary chamber generally concentric with said depending skirt of said dispenser body and adapted to fit into said first section of said neck portion of said container, a mixing passageway being formed between the external surface of said sleeve and the internal surface of said first section of said neck portion;
a plunger stem attached to said plunger disc and extending through said sleeve;
an activating bias spring located along said plunger stem between said plunger disc and an inwardly extending lower lip of said sleeve;
at least one water opening formed in said inwardly extending lip of said sleeve; and
a passageway to convey water to said pressure chamber.

* * * * *